United States Patent
Mizuno et al.

[11] Patent Number: 5,618,322
[45] Date of Patent: Apr. 8, 1997

[54] REFORMER FOR FUEL CELL SYSTEM

[75] Inventors: Yutaka Mizuno; Toshiharu Hanajima; Hisayoshi Matsubara, all of Iwata, Japan

[73] Assignee: Yamaha Hatsudoki Kabushiki Kaisha, Iwata, Japan

[21] Appl. No.: 195,991

[22] Filed: Feb. 14, 1994

Related U.S. Application Data

[63] Continuation of Ser. No. 826,644, Jan. 22, 1992, abandoned, which is a continuation of Ser. No. 542,305, Jun. 22, 1990, abandoned.

[30]      Foreign Application Priority Data

Jun. 23, 1989  [JP]  Japan ................................ 1-159419

[51] Int. Cl.⁶ ............................................... C10G 9/04
[52] U.S. Cl. ..................... 48/197 R; 48/61; 48/94; 48/127.7; 48/127.9; 48/198.6
[58] Field of Search .......................... 48/61, 94, 198.6, 48/198.7, 127.7, 127.9, 197 R; 422/200, 201, 202, 204, 211; 429/19

[56]                References Cited

U.S. PATENT DOCUMENTS

| | | | |
|---|---|---|---|
| 702,325 | 6/1902 | Nathan et al. | 422/200 |
| 1,920,886 | 8/1933 | Pier et al. | 422/211 |
| 2,248,993 | 7/1941 | Houdry | 422/200 |
| 2,644,744 | 7/1953 | Hartwig et al. | 422/202 |
| 2,667,410 | 1/1954 | Pierce | 48/127.9 |
| 3,094,391 | 6/1963 | Mader | 48/127.9 |
| 3,522,019 | 7/1970 | Buswell et al. | 48/94 |
| 3,541,729 | 11/1970 | Dantowitz | 48/94 |
| 3,635,682 | 1/1972 | Vine et al. | 422/204 |
| 3,909,299 | 9/1975 | Corrigan | 48/94 |
| 4,078,899 | 3/1978 | Keller et al. | 422/211 |
| 4,088,450 | 5/1978 | Kosaka et al. | 422/201 |
| 4,113,441 | 9/1978 | Suzuki et al. | 48/127.9 |
| 4,236,899 | 12/1980 | Gulden et al. | 422/201 |
| 4,241,043 | 12/1980 | Hetzel | 422/200 |
| 4,737,161 | 4/1988 | Szydlowski | 48/94 |
| 4,746,329 | 5/1988 | Christner et al. | 422/211 |
| 4,849,187 | 7/1989 | Uozu et al. | 48/94 |
| 4,861,397 | 8/1989 | Szydlowski | 48/94 |
| 4,909,809 | 3/1990 | Ohsaki et al. | 422/200 |

FOREIGN PATENT DOCUMENTS

| | | | |
|---|---|---|---|
| 0074570 | 3/1983 | European Pat. Off. | 422/211 |
| 2201903 | 9/1988 | United Kingdom | 422/211 |

*Primary Examiner*—Timothy McMahon
*Attorney, Agent, or Firm*—Knobbe, Martens, Olson & Bear LLP

[57]                ABSTRACT

A number of embodiments of reformers for reforming fuel for a fuel cell that includes an elongated catalyst bed with fuel to be reformed being delivered at one end of the bed and extracted from the other end of the bed. Heat is applied to a greater extent at the inlet end of the catalyst bed than the outlet end to prevent the formation of carbon monoxide in the products delivered from the outlet. In all embodiments, the catalyst bed has a spiral configuration and the fuel is heated before it is delivered to the catalyst bed. In some embodiments the same heat sources are employed for heating both the fuel and the catalyst bed.

10 Claims, 2 Drawing Sheets

REFORMER FOR FUEL CELL SYSTEM

This application is a continuation of application Ser. No. 07/826,644, filed Jan. 22, 1992 now abandoned, which is a continuation of U.S. patent application Ser. No. 07/542,305, filed Jun. 22, 1990 now abandoned.

BACKGROUND OF THE INVENTION

This invention relates to a reformer for a fuel system and a method for reforming fuel for a fuel cell system.

It is well known that fuel cells operate to react a fuel with air to generate electrical energy. The fuel is generally hydrogen that is derived from either methanol or a mixture of methanol and water. The fuel is reformed in a reformer in the presence of a catalyst and heat so as to provide the hydrogen. Obviously, the efficiency of the fuel cell can be improved by providing a longer reaction time within the catalyst. However, there is a practical limit to the size of the reformer that can be employed for obvious reasons. It has, therefore, been proposed to provide a reformer that has a relatively long catalyst path through which the fuel can travel so as to insure that all fuel is reformed.

However, there are additional difficulties in conjunction with the provision of such long catalyst paths in the reformer. This is because there are certain chemical reactions taking place in the reformer as set out below:

$$CH_3OH \rightarrow CO + 2H_2 \tag{1}$$

$$CO + H_2O \rightarrow CO_2 + H_2 \tag{2}$$

The first chemical reaction (equation 1) is an endothermic reaction, while the second (equation 2) is an exothermic reaction. However, the second equation tends to operate in the reverse direction in atmospheres of high temperature. When this occurs, then the CO content will increase and the fuel value will decrease. In addition, there may be attack of the platinum catalyst of the fuel cell. In the reformer systems previously proposed having long flow paths, the fuel reaching the end of the catalyst path may be heated to such a high elevation that the reverse reaction will occur with the aforenoted detrimental effects.

It is, therefore, a principal object of this invention to provide an improved reformer and method of reforming fuel wherein full reformation of the fuel can be assured without the generation of adverse components or constituents that could attack the catalyst of the fuel cell.

It is a further object of this invention to provide an improved compact reformer that will provide proper fuel reformation without generating components that could be dangerous to the performance of the fuel cell.

SUMMARY OF THE INVENTION

A first feature of this invention is adapted to be embodied in a reformer for reforming fuel for a fuel cell or the like and which comprises an elongated catalyst bed. A reformed fuel inlet is formed at one end of the catalyst bed for admitting fuel to be reformed therein. A reformed fuel outlet is positioned at the other end of the catalyst bed for discharging the reformed fuel therefrom. Means are incorporated for heating the catalyst bed to a higher level adjacent the reformed fuel inlet than adjacent the reformed fuel outlet.

A further feature of this invention is adapted to be embodied in a method for reforming fuel incorporating an elongated catalyst bed having a reformed fuel inlet at one end thereof for admitting fuel to be reformed and a reformed fuel outlet at the other end for discharging reformed fuel. In accordance with the invention, a higher degree of heat is applied to the catalyst adjacent the inlet rather than the outlet so that the catalyst bed will operate at a higher temperature at the inlet than at the outlet.

DETAILED DESCRIPTION OF THE PREFERRED EMBODIMENTS OF THE INVENTION

Figure 1:
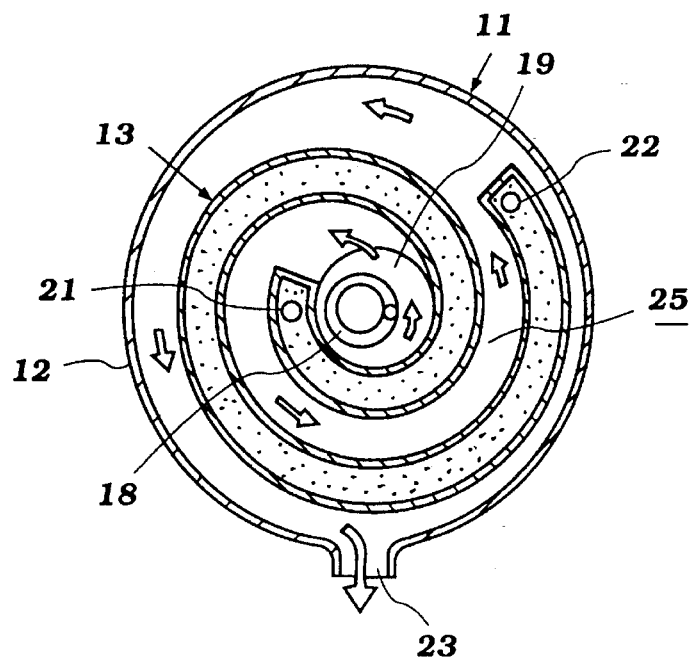
FIG. 1 is a cross sectional view taken through a reformer constructed in accordance with a first embodiment of the invention and operating in accordance with a method embodying the invention and is taken generally along the line 1—1 of FIG. 2.
Figure 2:
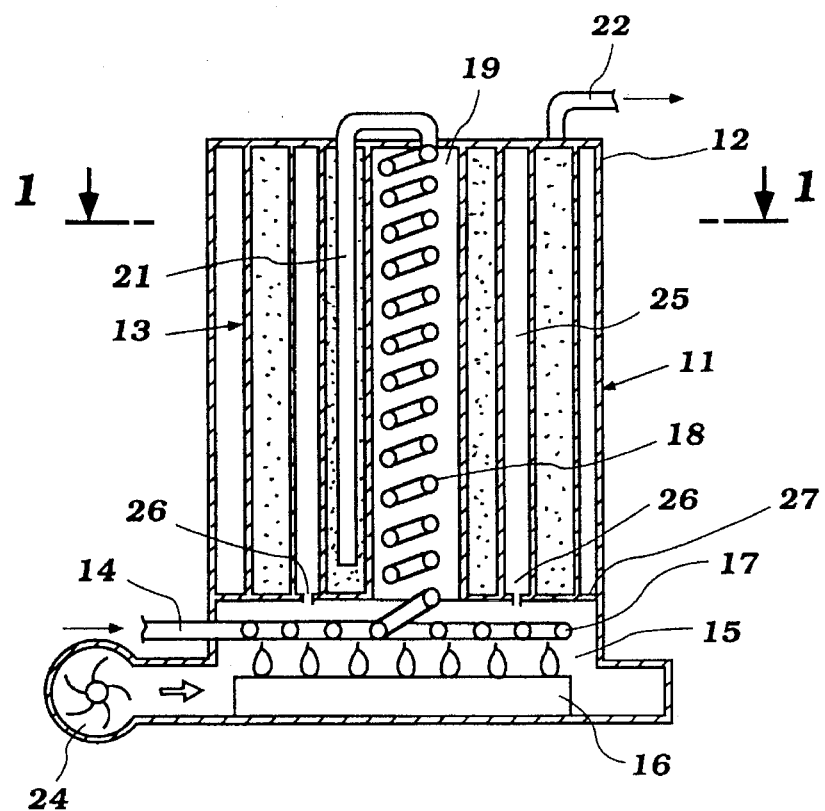
FIG. 2 is a transverse cross sectional view taken through the reformer of this embodiment.

Referring first to the embodiment of FIGS. 1 and 2, a reformer for a fuel cell constructed and operated in accordance with the invention is identified generally by the reference numeral 11. The reformer 11 is comprised of an outer shell, indicated generally by the reference numeral 12 and in which is contained a catalytic bed, indicated generally by the reference numeral 13 and configured in a spiral shape as best shown in FIG. 1. Any suitable catalyst may be employed for the catalyst bed 13 and specifically those catalysts which are particularly adapted for reforming a fuel mixture consisting of methanol and water into a hydrogen fuel for an associated fuel cell (not shown).

The fuel to be reformed is introduced to the reformer 11 through an inlet conduit 14 from a remotely positioned fuel source by means of a pump or the like (not shown). The lower portion of the reformer 11 is provided with a burner area 15 in which a burner 16 is positioned. The burner 16 is provided with suitable fuel such as the methanol. The reformed fuel inlet conduit 14 is provided with a spiral portion 17 that is positioned within the heater area 15 so that the fuel to be reformed will be preheated. In addition, a further spiral or coiled super heater portion 18 extends upwardly through a central area 19 of the catalyst bed 13. The fuel to be reformed is then introduced to the catalyst bed 13 through an inlet 21 that is positioned at the inner end of the spiral portion and which delivers the fuel to be reformed to the lower end thereof. The fuel then flows in a spiral pattern through the catalyst bed 13 from the center of its spiral portion at one end thereof, and is discharged through an outlet 22 at the other end of the catalyst bed for delivery to a storage tank and eventually the associated fuel cell.

In accordance with the invention, an arrangement is provided for supplying heat to the catalyst bed 13 in a generally spiral pattern beginning from the central portion 19 and extending to an outlet opening 23 formed in a side of the reformer shell 12 but spaced from the outlet end of the catalytic bed where the outlet 22 is positioned. To accomplish this, there is provided a blower motor 24 that supplies air for combustion to the burner 16 and which heated air then flows upwardly through the central portion 19 of the catalyst bed. This heated air will then flow through a spiral pattern through the air path 25 formed by the catalyst bed and eventually be discharged through the outlet 23.

Small air flow passages 26 are formed at spaced locations along a lower wall 27 of the reformer 11 so as to control the amount of heat delivered to the various areas. However, it is important that the heat is provided at a greater amount adjacent the inlet 21 than the outlet 22 to prevent the formation of carbon monoxide, as aforenoted. As a result, the temperature in the bed 13 will be highest at the inlet 21 and lowest at the outlet 22 and will be generally progressively decreasing in temperature from the inlet 21 to the outlet 22.

Figure 3:
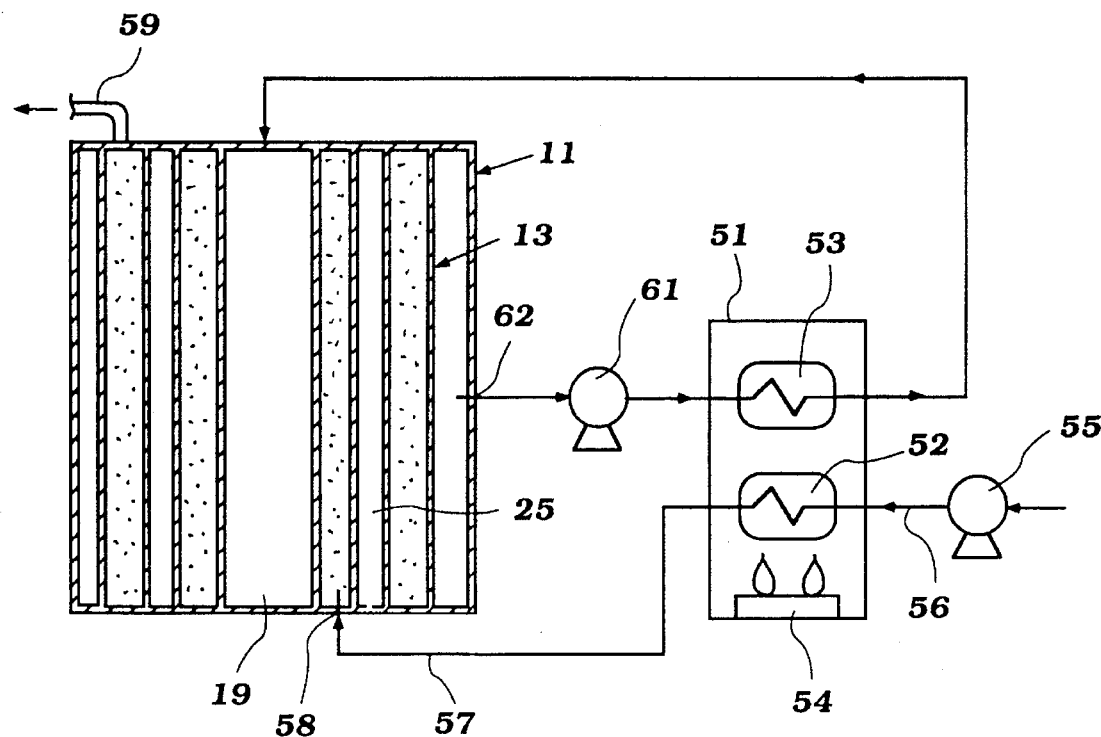
FIG. 3 is a schematic view with portions shown in cross section of a reformer constructed in accordance with another embodiment of the invention.

FIG. 3 shows another embodiment of the invention wherein the reformer 11 has the same general configuration of the embodiment of FIGS. 1 and 2. However, in this embodiment, the catalytic bed 13 is heated by a liquid rather than a gas and the heat exchanger for heating the liquid and for vaporizing the fuel to be reformed is external. In this embodiment, components which are the same as the previously described embodiment have been identified by the same reference numerals.

In this embodiment, a separate heat exchanger, indicated generally by the reference numeral 51 is provided that has a fuel vaporizing portion 52 and a liquid heating portion 53. In addition, a burner 54 supplies heat for vaporizing the fuel in the vaporizer 52 and heating the liquid in the heater 53.

A feed pump 55 delivers fuel to be reformed from the remote fuel tank through an inlet conduit 56 to the vaporizer 52. The vaporized fuel is then delivered to the catalytic bed 13 through a conduit 57 which has an inlet opening 58 at the inner end of the spiral of the catalytic bed 13 and at the lower portion thereof. The fuel to be reformed then flows through the spiral pattern and is delivered through an outlet 59 to the fuel cell. Like the embodiment of FIGS. 1 and 2, the delivery of fuel to be reformed at the bottom of the catalyst and discharged at the top further elongates the flow path through the catalytic bed.

A suitable liquid is circulated by a pump 61 through the heater 53 and then is introduced to the central area 19 of the reformer 11. This heated liquid then flows in a spiral pattern around the catalyst bed 13 so that its temperature will drop and apply less heat to the outlet side of the catalyst bed than to the inlet side, as with the previous embodiment. This liquid is then returned through a return 62 to the pump 61 for recirculation.

Figure 4:
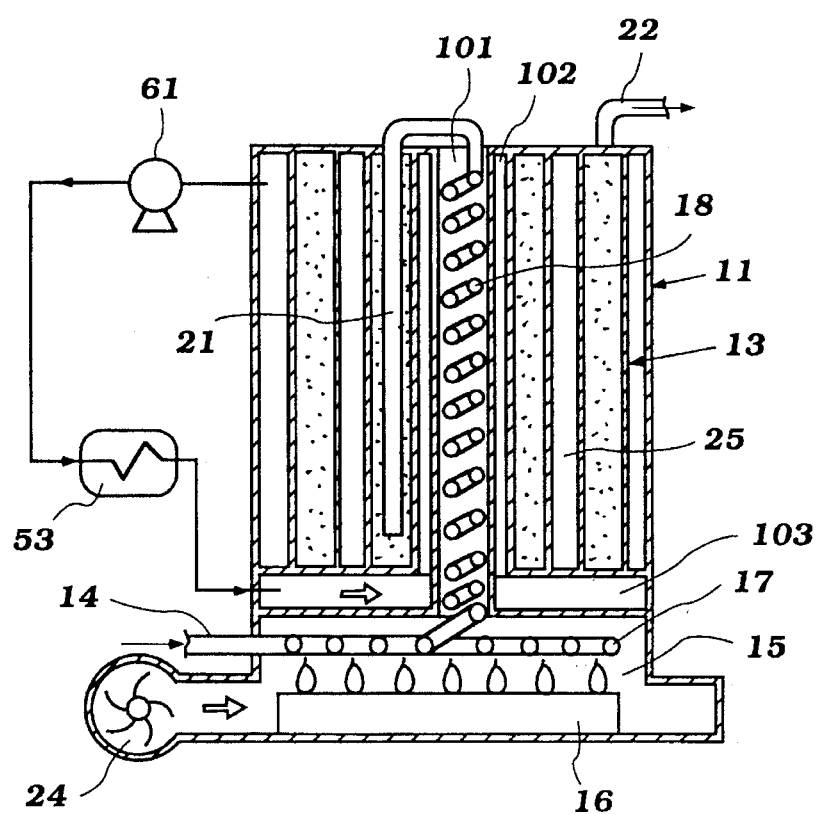
FIG. 4 is a cross sectional view, in part similar to FIG. 2, and shows yet another embodiment of the invention.

FIG. 4 shows yet another embodiment of the invention which, in effect, combines the embodiments of FIGS. 1 and 2 and FIG. 3. That is, in this embodiment, the fuel to be reformed is heated by a heater 16 as in the embodiment of FIGS. 1 and 2 which discharges the heat applied to the super heating coil 18 through a central stack area which is discharged from a discharge stack 101. Liquid heated by a heater 53 is, however, circulated also in a spiral path around the catalyst bed 13 which is provided by an inlet section 102 that encircles the stack 101 and the heat exchange path 25 as previously described. This liquid is introduced to an area 103 that extends across the upper end of the heater 16 so that further heat will be applied to the liquid from this heater. As a result, further energy savings are possible with this embodiment, but in all other regards, it operates the same as the embodiments as already described.

It should be readily apparent from the foregoing description that the embodiments of the invention are particularly adapted to reform fuel for a fuel cell in such a manner as to permit good reformation of all of the fuel in a relatively small and compact area while, at the same time, preventing overheating of the reformed fuel, such as might cause carbon monoxide to be present in the discharged products. Although a number of embodiments of the invention have been illustrated and described, various changes and modifications may be made without departing from the spirit and scope of the invention, as defined by the appended claims.

We claim:

1. A reformer for reforming fuel for a fuel cell comprising a reformer housing defining an internal cavity, an elongated catalyst bed contained within said reformer housing cavity and extending from a first position therein to a second position therein spaced from said first position, a fuel inlet in said reformer housing at one end of said catalyst bed and at said first position for admitting fuel to be reformed thereto into contact with said catalyst bed and the fuel then passing along the length of said catalyst bed to a reformed fuel outlet in said reformer housing at the other end of said catalyst bed and at said second position for discharging reformed fuel therefrom, said fuel inlet, said reformed fuel outlet, said catalyst bed and said reformer housing being configured and arranged so that fuel to be reformed must flow completely along said catalyst bed from said fuel inlet before discharge from said reformed fuel outlet, and means for heating said catalyst bed to a higher level adjacent said fuel inlet than adjacent said reformed fuel outlet so that said one end of said catalyst bed will be at a higher temperature than said other end of said catalyst bed to limit the reaction temperature within said bed wherein the catalyst bed has a spiral configuration and the reformer housing cavity is cylindrical, the fuel inlet being at the end of the catalyst bed closest to the center of the cavity and the reformed fuel outlet being at the end of the catalyst bed closest to the periphery of said cavity.

2. A reformer as set forth in claim 1 further including means for heating the fuel to be reformed prior to delivery to the catalyst bed.

3. A reformer as set forth in claim 2 wherein the means for heating the catalyst bed comprises means for circulating a heated fluid from the first position within the reformer housing cavity and adjacent the catalyst bed in a direction from the fuel inlet toward the reformed fuel outlet.

4. A reformer as set forth in claim 3 wherein the spiral of the bed defines a center area containing a conduit through which the fuel to be reformed is passed prior to delivery to the bed and wherein the heated fluid is delivered to said center area around the conduit for super heating the fuel to be reformed before delivery of the fuel to the catalyst bed through the fuel inlet.

5. A reformer as set forth in claim 2 wherein the means for heating the fuel also heats a fluid that heats the catalyst bed.

6. A reformer as set forth in claim 1 wherein the reformed fuel inlet is at one side of the catalyst bed and the reformed fuel outlet is at the other side of the catalyst bed.

7. A reformer as set forth in claim 1 wherein the catalyst bed is in a spiral configuration and the means for heating the catalyst bed comprises means for circulating a heated fluid from the center of the spiral of the catalyst bed contiguous the fuel inlet toward the reformed fuel outlet.

8. A reformer as set forth in claim 7 wherein the bed heating means in addition to delivering heated fluid to the center of the catalyst bed spiral also delivers a portion of the heated fluid at spaced locations along the length of the catalyst bed.

9. A reformer as set forth in claim 2 wherein the catalyst bed is heated by circulating a heated fluid therearound and the same heat source heats both the fluid and the fuel to be reformed.

10. A reformer as set forth in claim 9 wherein the heat source is positioned externally of the catalyst bed.

* * * * *